US008472640B2

(12) United States Patent  
Marton

(10) Patent No.: US 8,472,640 B2
(45) Date of Patent: Jun. 25, 2013

(54) ELEVATED TOROID MICROPHONE APPARATUS

(75) Inventor: Trygve Frederik Marton, Oslo (NO)

(73) Assignee: Cisco Technology, Inc., San Jose, CA (US)

( * ) Notice: Subject to any disclaimer, the term of this patent is extended or adjusted under 35 U.S.C. 154(b) by 780 days.

(21) Appl. No.: 12/645,701

(22) Filed: Dec. 23, 2009

(65) Prior Publication Data

US 2010/0166219 A1 Jul. 1, 2010

Related U.S. Application Data

(60) Provisional application No. 61/140,307, filed on Dec. 23, 2008.

(30) Foreign Application Priority Data

Dec. 23, 2008 (NO) .................................... 20085371

(51) Int. Cl.
*H04R 3/00* (2006.01)

(52) U.S. Cl.
USPC ................ 381/92; 381/91; 381/122; 381/111

(58) Field of Classification Search
USPC ............... 381/91, 92, 95, 122, 111, 112, 113, 381/114, 115
See application file for complete search history.

(56) References Cited

U.S. PATENT DOCUMENTS

| | | | |
|---|---|---|---|
| 3,502,811 A | 3/1970 | Schroeder et al. | |
| 4,589,137 A | 5/1986 | Miller | |
| 7,587,054 B2 * | 9/2009 | Elko et al. | 381/92 |
| 8,050,432 B2 * | 11/2011 | De Klerk | 381/304 |
| 8,204,247 B2 * | 6/2012 | Elko et al. | 381/92 |

FOREIGN PATENT DOCUMENTS

| | | |
|---|---|---|
| EP | 0 398 595 A2 | 11/1990 |
| GB | 2 066 620 A | 7/1981 |
| GB | 2 146 870 A | 4/1985 |
| WO | WO 2005/074317 A1 | 8/2005 |

OTHER PUBLICATIONS

Gary W. Elko, "Microphone array systems for hands-free telecommunication", Speech Communication, Elsevier Science Publisheers, Amsterdam, NL, vol. 20, No. 3-4, Dec. 1, 1996, pp. 229-240. ISSN: 0167-6393.
U.S. Appl. No. 12/637,444, filed Dec. 14, 2009, Marton et al.
U.S. Appl. No. 12/691,509, filed Jan. 21, 2010, Marton.

* cited by examiner

*Primary Examiner* — Vivian Chin
*Assistant Examiner* — Con P Tran
(74) *Attorney, Agent, or Firm* — Oblon, Spivak, McClelland, Maier & Neustadt, L.L.P.

(57) ABSTRACT

A video teleconferencing directional microphone includes three microphone elements arranged coincidentally on a vertical axis. The three microphone elements are placed on a supporting surface so that a first microphone element is on the surface, and the second and third microphone elements are elevated above the supporting surface. The directional microphone also includes three filters, a summing node, and an equalizer, which are used to shape the directivity pattern of the directional microphone into an elevated toroid sensitivity pattern. The elevated toroid sensitivity pattern increases sensitivity in the direction of a sound source of interest, but reduces sensitivity to any sound waves generated by noise sources at other locations.

20 Claims, 10 Drawing Sheets

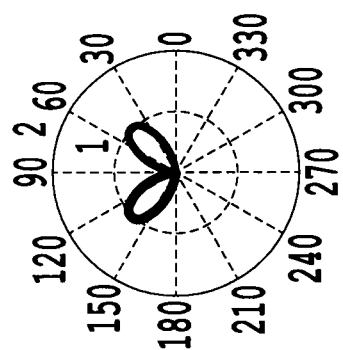
Fig.5A 100Hz
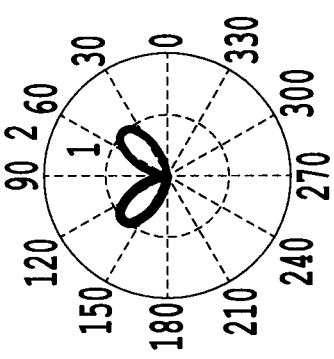
Fig.5B 240Hz
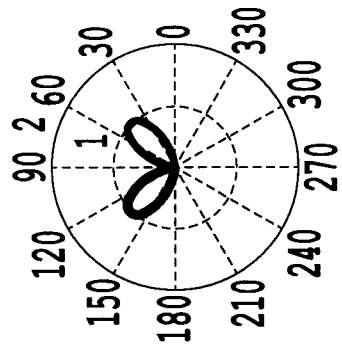
Fig.5C 577Hz
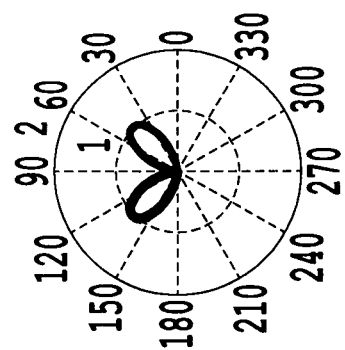
Fig.5D 1386Hz
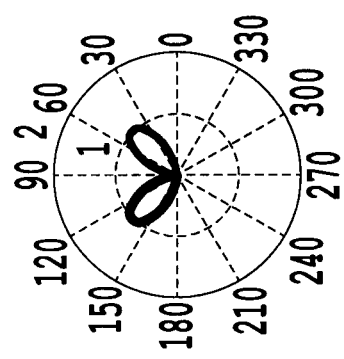
Fig.5E 3330Hz
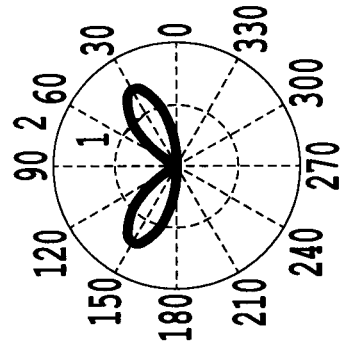
Fig.5F 8000Hz

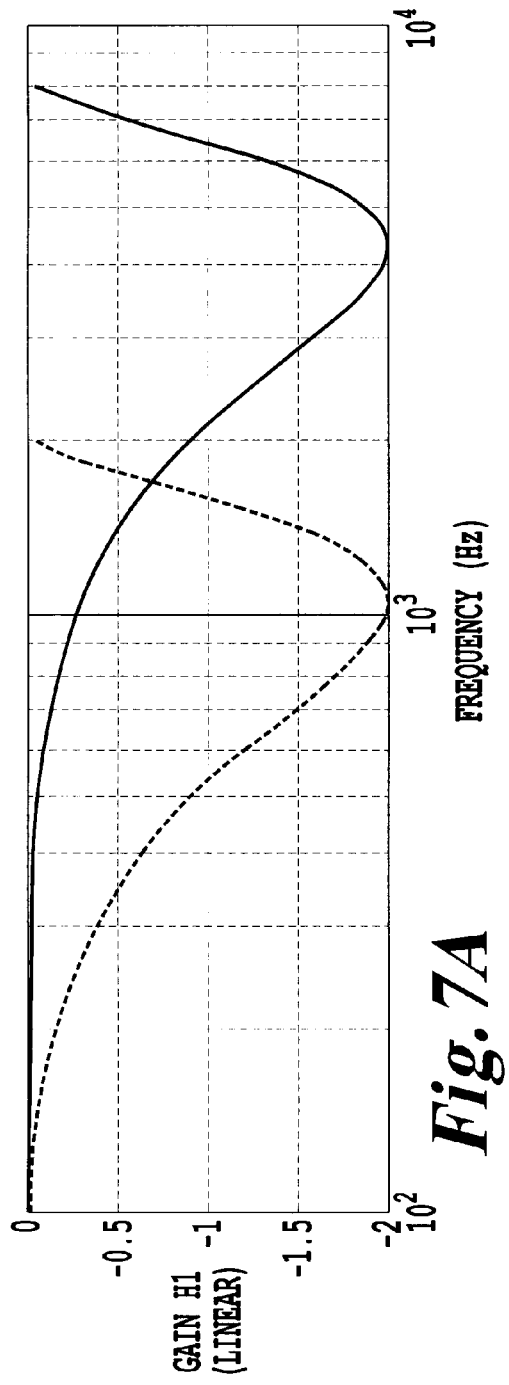
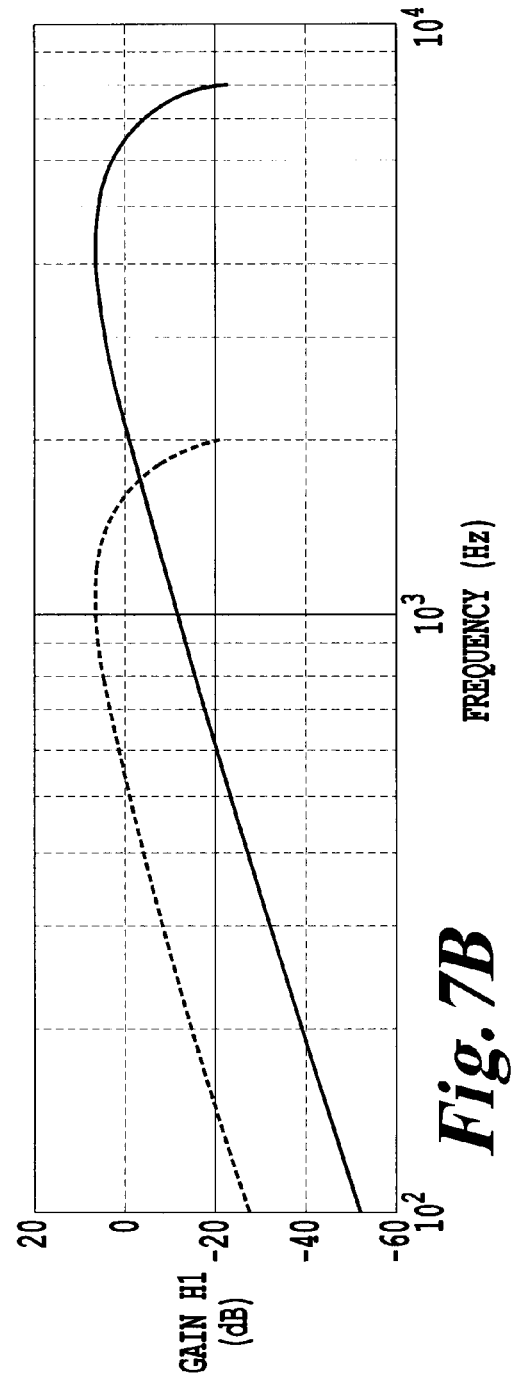
*Fig. 7A*
*Fig. 7B*

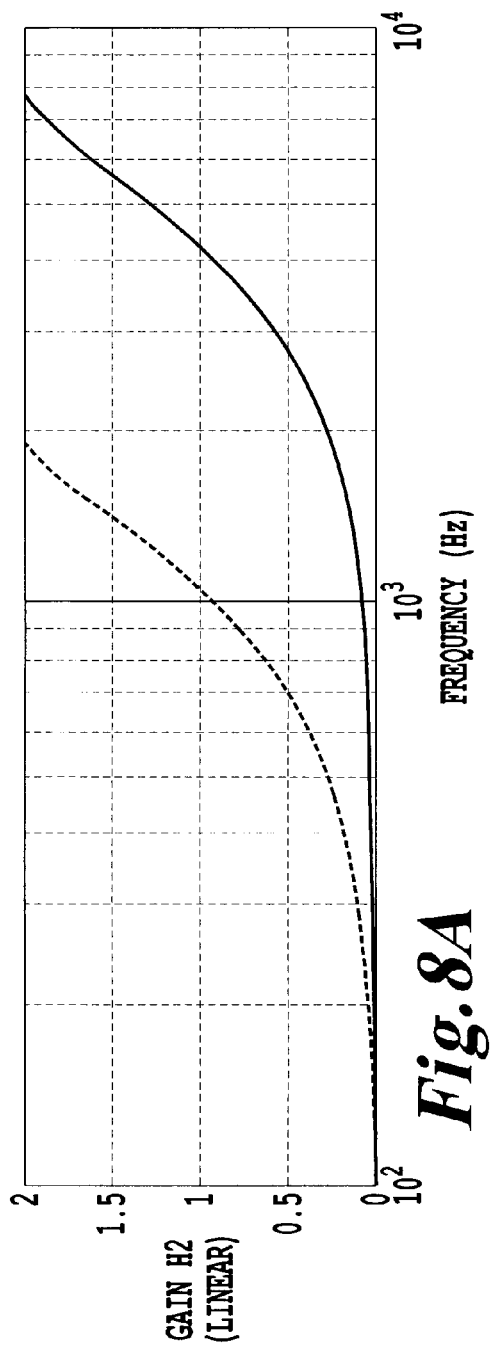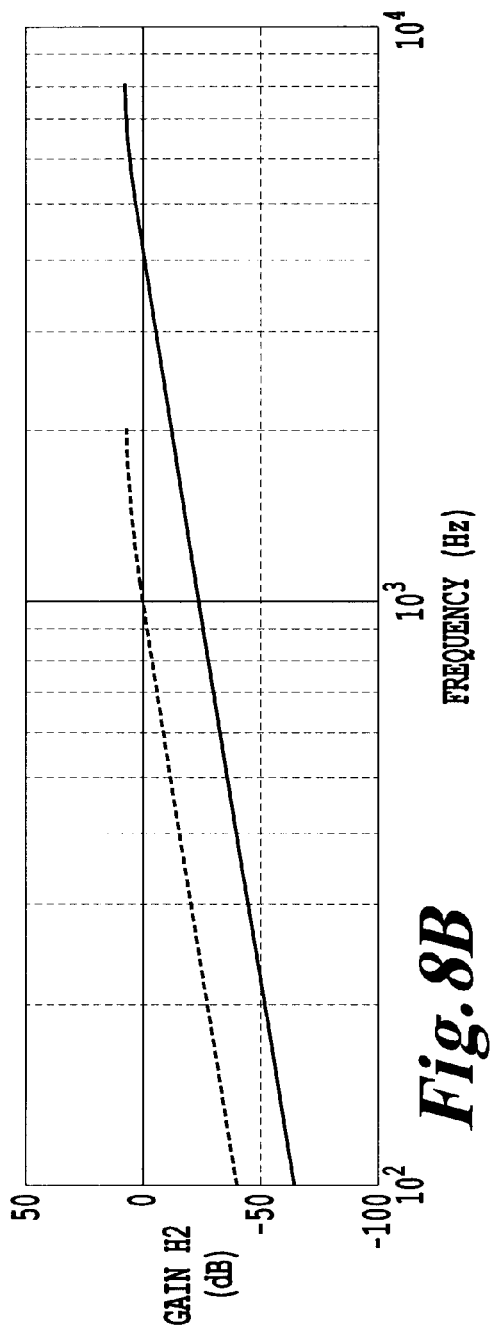
Fig. 8A
Fig. 8B

ELEVATED TOROID MICROPHONE APPARATUS

CROSS-REFERENCE TO RELATED APPLICATION

The present application is based upon and claims the benefit of priority from U.S. provisional Application No. 61/140,307 entitled, "Elevated Toroid Microphone Apparatus" and filed Dec. 23, 2008, and Norwegian application NO20085371, filed Dec. 23, 2008. The present application is also related to U.S. application Ser. No. 12/637,444 entitled, "Toroid Microphone Apparatus" and filed Dec. 14, 2009, and U.S. application Ser. No. 12/691,509 entitled, "Ceiling Microphone Assembly" and filed Jan. 21, 2010. The entire contents of each of these applications are incorporated herein by reference.

BACKGROUND

A microphone apparatus of a video teleconferencing system is provided. More specifically, a microphone having a sensitivity pattern that is independent of the microphone's azimuth angle, and that maximizes sensitivity in the direction of a sound source of interest while minimizing sensitivity to sound from other directions is described.

Video teleconferencing systems are used to create virtual meetings between two or more parties situated at different locations. The locations may be within a same building or in different buildings in different cities, countries, continents, etc. Thus, video teleconferencing systems create meetings that would otherwise require travel of potentially large distances.

To create virtual meetings, video teleconferencing systems transmit both video and audio data, and thus these systems include one or more microphones to capture sound waves. The microphones convert sound waves generated in one video teleconferencing room into electrical impulses for transmission to another video teleconferencing room. The quality of this transmitted audio is therefore directly dependent on the positioning of the microphone within the room, the acoustics of the room, and the characteristics of the microphone itself.

For example, a conventional microphone used to capture sound from a sound source of interest, such as a person speaking, will receive direct sound waves, reflected sound waves and reverberant sound waves from the source. Direct sound waves travel directly to the microphone without reflection, and are the sound waves intended to be captured by microphones. The level of direct sound waves is inversely proportional to the distance between the sound source of interest and the microphone receiving the sound.

Reflected sound waves do not travel directly to the microphone. Instead, they are reflected multiple times by objects in the room, or the room itself, before reaching the microphone. For example, sound waves from a sound source of interest may be reflected by walls, floors, ceilings, chairs, etc. Reflected sounds waves that propagate less than 50-80 ms (corresponding to a propagation distance of 17 to 27 meters) before reaching the microphone are known as "early reflections".

Early reflections from the sound source of interest may positively contribute to the audio received by the microphone. However, they may also distort the audio by causing a comb filtering effect. Early reflections have pressure levels approximately equal to those of direct sound waves, but are delayed in time. This time delay causes a phase difference between the two sound waves that may result in cancellation of some of the frequency components of the direct sound wave when direct sound waves combine with early reflections. This phenomenon is known as "comb filtering", and has a negative impact on sound quality.

Reflections that propagate for more than 50 to 80 ms (17 to 27 meters) are known as "reverberant sound". Reverberant sound arrives at the microphone from nearly every direction because these sound waves have reflected many times within the room. Also, their pressure level is largely independent of microphone-sound-source distance. Unlike early reflections, reverberant sound always contributes negatively to audio quality by creating a "distant", "hollow", and/or "muffled" characteristic.

The level of distortion cause by reverberant sound is determined by a ratio of a level of direct sound to a level of reverberant sound. For example, if the sound source of interest is very close to the microphone the ratio of direct sound to reverberant sound is large, and distortion is small. As the sound source of interest moves away from the microphone the ratio of direct sound to reverberant sound will decrease, increasing distortion.

A distance at which the level of the direct sound equals the level of the reverberant sound is known as the "room radius", which can be determined for every room. As a sound source of interest moves outside of the room radius, reverberant sound dominates and distortion increases. Conversely, as the sound source moves within the room radius the direct sound dominates, and distortion decreases. Therefore, for conventional microphone systems, the sound source of interest should remain within the room radius to avoid significant audio distortion.

Moreover, direct sound, reflected sound, and reverberant sound are not limited to the sound source of interest, and may also be present for noise sources in a video teleconferencing room. Noise sources include, for example, fan noise from ventilation systems, cooling fan noise from electronic equipment, noises from outside of the video teleconferencing room, and noises made directly on the table by people writing with pens, setting down cups, table-top computer keyboard typing, moving chairs, etc. Conventional video teleconferencing system microphones receive direct, reflected and reverberant sound waves from these noise sources as well, deteriorating audio quality.

Further, each noise source has a different dominant component. For example, cooling fans installed on electrical equipment and noise originating outside of the video teleconferencing room primarily contribute noise in the form of reverberant sound waves. Noise generated directly on the table-top surface on which the microphone is placed contributes direct sound waves that travel parallel to the surface of the table. Some noise sources, such as ventilation systems, even contribute multiple noise components, i.e. direct and reverberant sound waves.

Conventional microphones may also contribute noise in the form of an echo. An echo occurs when sound from a loudspeaker used to reproduce audio transmitted from remote parties to the video teleconference is captured by the microphone and retransmitted to the remote party. Echoes also have a direct, reflected and reverberant sound components, but dominance of one component over the others is determined by a loudspeaker-to-microphone distance, which is not always constant.

Echoes are conventionally attenuated with echo cancellers, which are adaptive filters that adapt to a loudspeaker-microphone channel response. However, echo cancellers cannot prevent a microphone from receiving an echo. Instead, echo cancellers merely attenuate echoes already present in an audio signal. Further, because of their adaptive nature, echo cancellers require time to adapt to a given response, making time-invariant loudspeaker-microphone channel responses desirable. In practice, however, microphones may be repositioned during a video teleconference in order to capture audio from several different sound sources, and time-invariant loudspeaker-to-microphone channels are difficult to achieve. Thus, a conventional video teleconferencing system's echo cancellers are typically required to adapt multiple times. Moreover, echo cancellers have difficulty attenuating reverberant sound components, resulting increased computational complexity as the level of reverberant echoes increase.

This problem is exacerbated when omni directional microphones are used in video teleconferencing systems. An omni directional microphone receives audio from all directions with equal sensitivity, and thus receives direct, reflected and reverberant sounds from every sound source within the room, including noise sources. In fact, only noise sources below the conference table will be attenuated because the table functions as a barrier to sound pressure waves. Though omni directional microphones are capable of capturing audio from all sound sources of interest without being repositioned, the resulting audio quality is poor because of captured noise source sound.

One way to improve the quality of audio transmitted by a video teleconferencing system is to use directional microphones. Unlike omni directional microphones, a directional microphone has higher sensitivity with respect to certain directions over others, and inherently filters sound from at least some noise sources. This improves audio quality relative to an omni directional microphone, but also requires that a directional microphone be oriented to align its direction of highest sensitivity ("main axis") toward the sound source of interest. Therefore, the directional microphone requires repositioning every time the sound source of interest changes position.

Directional microphones having a cardioid sensitivity pattern or a bidirectional sensitivity pattern are typically used in video teleconferencing. A microphone having a cardioid sensitivity has a directivity function given by: $g(\alpha)=\frac{1}{2}+\frac{1}{2}\times\cos(\alpha)$, where $\alpha$ is the azimuth angle of a main axis with respect to horizontal. A typical cardioid microphone has a maximum sensitivity at $\alpha=0°$ and a minimum sensitivity at $\alpha=180°$.

A bidirectional microphone has a directivity function given by: $g(\alpha)=\cos(\alpha)$, where $\alpha$ is also the azimuth angle of a main axis with respect to horizontal. This microphone has a maximum sensitivity for $\alpha=0°$ and $\alpha=180°$, and a minimum sensitivity when $\alpha=90°$ and $\alpha=270°$. Because both the cardioid and bidirectional sensitivity patterns on the azimuth angle of the microphone, sensitivity for these microphones varies horizontally and vertically.

As discussed above, either a cardioid microphone or a bidirectional microphone may be used in a video teleconferencing system to improve audio quality. Placing the cardioid or bidirectional microphone on a table also improves audio quality because the table acts as a sound barrier to sound origination below the table surface, improving the direct to reverberant audio ratio.

Microphone sensitivity may also be improved by placing the microphone directly on the table-top surface because at this level the microphone receives direct sound waves and sound waves reflected by the table (i.e. early reflections). The direct sound waves and reflected sound waves reflected by the table remain in phase, and combine to form a pressure wave that is double that of the direct sound wave. This effectively increases the microphone sensitivity is by six decibels, and is commonly referred to as the "boundary principle".

However, directional microphones still require that the sound source of interest remain located near the main sensitivity direction of the microphone. Thus, when several people take part in the meeting, the microphone must be continually readjusted to avoid diminished audio quality. This requires people taking part in the video teleconference to be aware of the sensitivity patterns of the microphone in order to make position adjustments, and makes directional microphones difficult to use for non-professional users.

Conventional microphone systems use several directional microphones to avoid microphone repositioning. For example, one conventional microphone uses four cardioid elements rotated at 90° relative to each other, and selects audio from the microphone element having a main axis closest to the active sound source of interest. Another conventional microphone system uses two bidirectional microphone elements placed at 90° relative to each other, and audio processing to create a virtual microphone sensitivity pattern. For example, if the physical bidirectional patterns of the two bidirectional microphones exist at main axes 0° and 90°, virtual patterns may be created in the range of 45° to 135°.

However, the above-described conventional microphone systems create time-varying loudspeaker-microphone channel responses that increase the complexity of canceling echoes, and force echo cancellers to adapt more frequently. Optimal echo cancellation may be prevented by frequent echo canceller retraining. These conventional microphone systems also require more complex hardware, increasing a difficulty of installation.

To avoid increasing system complexity and difficult installations, fixed-sensitivity-pattern microphones are preferred in video teleconferencing systems. The omni directional microphone discussed above has a fixed sensitivity pattern, but lacks the ability to suppress reverberant sound. Directional microphones also have fixed sensitivity patterns and suppress reverberant sound, but require frequent repositioning.

Therefore, as recognized by the present inventor, a need exists for a microphone having a sensitivity pattern that is independent of azimuth angle and maximizes sensitivity in the direction of sound sources of interest. The sensitivity pattern should also reduce sensitivity to sound waves arriving at the microphone from a vertical direction (i.e. overhead noise sources) and a horizontal direction (i.e. table-top noise sources).

SUMMARY

An elevated toroid microphone includes a first microphone element assembly that has a first microphone element arranged adjacent to a supporting surface and a first filter connected to the first microphone element. The frequency response of the first filter is defined as ($H_0$). The elevated toroid microphone also includes a second microphone element assembly having a second microphone element arranged at a predetermined distance (d) from the supporting surface and a second filter connected to the second microphone element. The frequency response of the second filter is ($H_1$). A third microphone assembly has a third microphone element arranged at twice the predetermined distance (d) from the supporting surface and is connected to a third filter. The third filter has a frequency response of ($H_2$). An adder combines the output of the first, second and third microphone assemblies into an adder output that is equalized by an equalizer to generate an equalized output. The combination of $H_0$, $H_1$, and $H_2$ generates an elevated toroid directivity pattern for the elevated toroid microphone.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings. However, the accompanying drawings and their exemplary depictions do not in any way limit the scope of the inventions embraced by this specification. The scope of the inventions embraced by the specification and drawings are defined by the words of the accompanying claims.

FIGS. 5A-5F respectively include elevated toroid sensitivity pattern graphs for six frequencies according to an exemplary embodiment of the present disclosure;

FIGS. 7A-7B are magnitude plots of the frequency response ($H_1$) according to an exemplary embodiment of the present disclosure;

FIGS. 8A-8B are magnitude plots of the frequency response ($H_2$) according to an exemplary embodiment of the present disclosure;

DETAILED DESCRIPTION

In the following, the present advancement will be discussed by describing a preferred embodiment with reference to the accompanying drawings. However, those skilled in the art will recognize other applications and modifications within the scope of the disclosure as defined in the enclosed claims.

Figure 1:
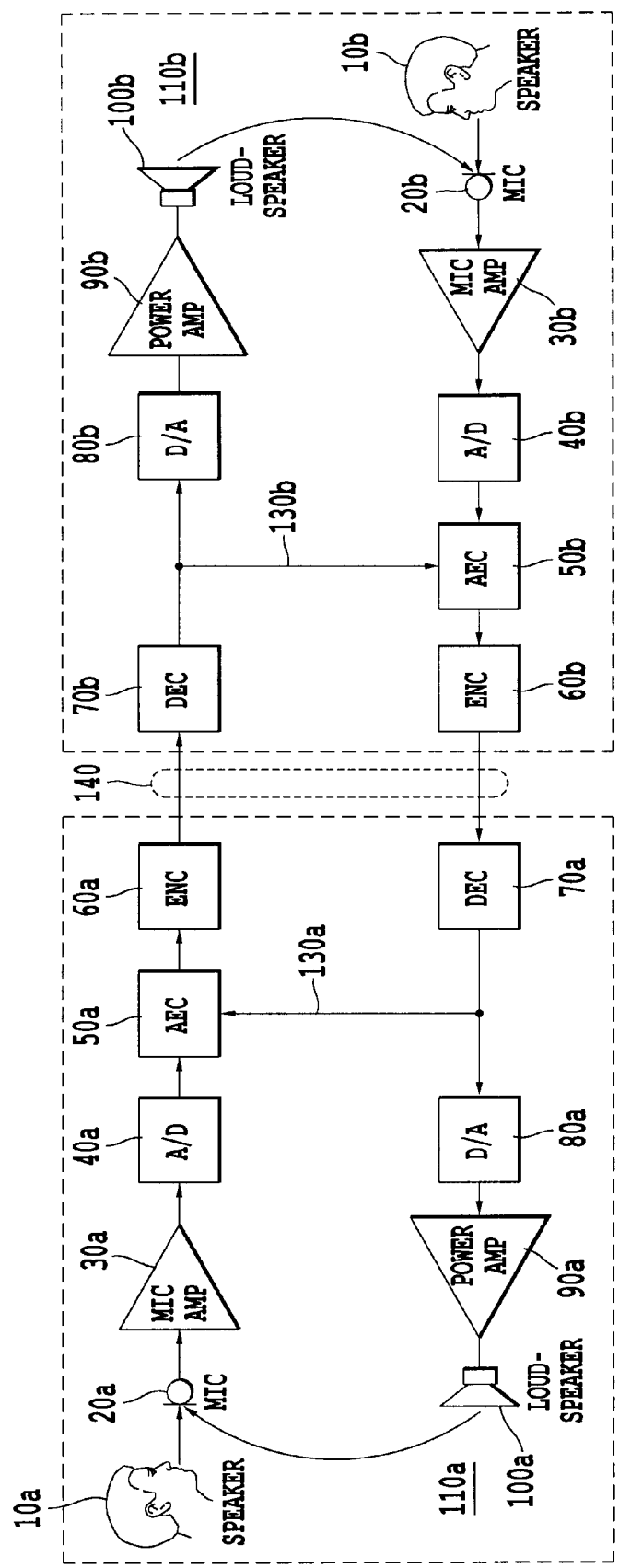
FIG. 1 is a schematic drawing of a video teleconferencing system's audio distribution section including microphones according to an exemplary embodiment of the present disclosure.

FIG. 1 is a schematic representation of an audio portion of a video teleconferencing system. In FIG. 1, speaker 10a, in room 110a, and speaker 10b, in room 110b, are engaged in a video teleconference. Rooms 110a and 110b may be physically adjacent to each other in the same building, or separated by many hundreds or thousands of miles. Therefore, a communication link 140 is used to transfer video and audio data between rooms 110a and 110b.

The exemplary communication link 140 may be wired, such as a PSTN telephone system, Wide Area Network (WAN), Local Area Network (LAN), or Ad-hoc. The exemplary communication link 140 may also be a wireless, such as a cellular network, WiMax, Wifi, or via satellite link. Further, the communication link 140 may also be a combination of the wired and wireless networks.

Rooms 110a and 110b of FIG. 1 are mirror images of each other, and contain the same equipment. Of course, those skilled in the art will recognize that alternative configurations are embodied by the advancements described herein. Each room 110a and 110b includes an elevated toroid microphone 20a or 20b, a microphone amplifier 30a or 30b, an A/D converter 40a or 40b, an echo canceller 50a or 50b, an encoder 60a or 60b, a decoder 70a or 70b, a D/A converter 80a or 80b, a power amplifier 90a or 90b, and a loudspeaker 100a or 100b.

When speaker 10a speaks, the sound waves from his or her voice travel to elevated toroid microphone 20a and are converted to electrical impulses. Microphone amplifier 30a amplifies these electrical impulses, and A/D converter 40a converts them to digital audio data. The digital audio data then travels to the echo canceller 50a, which taps the output of decoder 70a using transmission path 130a, to reduce any echo contained in the digital audio data. Once the echo has been reduced, the digitized audio data is transferred to the encoder 60a, which encodes the digitized signal according to a format of the communication link 140. The communication link 140 then carries the digitized audio data to room 110b.

Digital audio data received at room 110a is first decoded by the decoder 70a according to the transmission protocol of the communication link 140. This decoded digital audio data is used to reduce echo, as discussed above, and also converted into electrical impulses by the D/A converter 80a. The electrical impulses are amplified by the power amplifier 90a and converted to sound waves by the loudspeaker 100a.

Though the above description refers only to room 110a, it is equally applicable to room 110b, as one of ordinary skill in the art will recognize. Therefore, the audio portions of the video teleconferencing systems in rooms 110a and 110b allow speakers 10a and 10b to simultaneously exchange audio data across the communication link 140.

Moreover, microphone amplifier 30a, A/D converter 40a, echo canceller 50a, encoder 60a, decoder 70a, D/A converter 80a, and power amplifier 90a may be implemented separately as hardware or software elements or integrated into a single device, such as an ASIC "System on a Chip". Microphone amplifier 30b, A/D converter 40b, echo canceller 50b, encoder 60b, decoder 70b, D/A converter 80b, and power amplifier 90b may be similarly integrated, or individually implemented.

While a video teleconference is described above with respect to two speakers in two rooms, other configurations are also possible. For example, three or more rooms may by linked by communication link 140 to a common teleconference, and more than one speaker may also be present in each of the rooms. Additionally, a self-contained, table-top teleconference unit may be used to allow each speaker to join the teleconference without leaving their desk, and some speakers may also join the teleconference using audio-only communications. As will be recognized by those skilled in the art, numerous other video teleconferencing configurations are possible without departing from the scope of the present disclosure.

Figure 2:
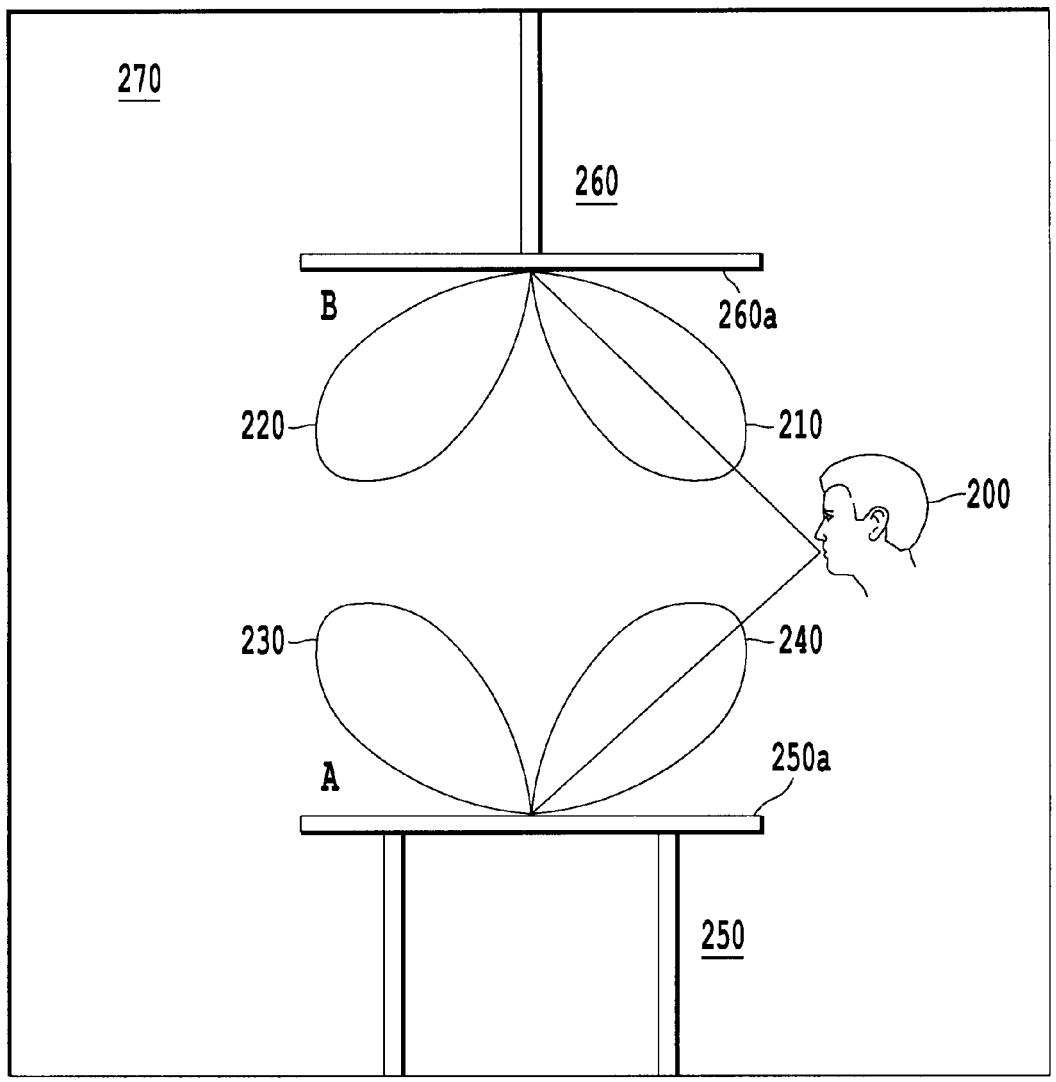
FIG. 2 is a schematic drawing of the elevated toroid sensitivity patterns of elevated toroid microphones arranged overhead and on a table-top according to an exemplary embodiment of the present disclosure.

FIG. 2 is a schematic of the elevated toroid sensitivity patterns of two elevated toroid microphones, A and B, according to an exemplary embodiment of the present disclosure. Room 270 includes an exemplary overhead mount 260 to which elevated toroid microphone B is attached, and an exemplary table 250 on which elevated toroid microphone A is placed. However, elevated toroid microphones A and B are both included in room 270 of FIG. 2 only fir the sake of describing the present advancement. As is recognized by one skilled in the art, room 270 may only include elevated toroid microphone A or, alternatively, may only include elevated toroid microphone B.

An elevated toroid microphone mounted in an overhead position, such as elevated toroid microphone B, includes elevated toroid sensitivity pattern having a cross-section 210. The elevated toroid sensitivity pattern of microphone B is not limited to cross-section 210, but extends in all compass directions, 0° to 360°, encircling microphone B and forming an elevated toroid.

The cross-section 210 of the elevated toroid sensitivity pattern defines a region of increased sensitivity to sound for elevated toroid microphone B. In FIG. 2, cross-section 210 is aligned with speaker 200. Thus, microphone B is more sensitive to sound originating from speaker 200 than from other sources. For example, microphone B is relatively insensitive to sound traveling along the overhead mount surface 260a because the overhead mount surface 260a is not encompassed by cross-section 210. Microphone B is similarly insensitive to sound traveling directly perpendicular to the overhead mount surface 260a because of the gap in the middle of cross-section 210.

In an alternative location, FIG. 2 includes microphone A mounted on an exemplary table-top surface 250a of table 250. The sensitivity pattern of microphone A is defined by a cross-section 240. As discussed above, with reference to microphone B, the sensitivity pattern of microphone A is not limited to cross-section 240, but completely surrounds microphone A, forming a toroid.

As speaker 200 is aligned with cross-section 240, microphone A is sensitive to sound from speaker 200, but relatively insensitive to any sound traveling parallel to the table-top surface 250a or in a downward vertical direction. Therefore, microphone A is relatively insensitive to table-top noise or overhead noise.

In FIG. 2, the overhead mount 260 and table 250 are merely exemplary, and therefore not limiting. For example, the overhead attachment 260 may be of any shape, and material commonly used in the art, as long as the surface where the elevated toroid microphone is attached is flat. In a preferred embodiment, the height of the overhead attachment 260 is adjusted so that a microphone-to-mounting surface angle of 45° aligns the elevated toroid sensitivity pattern with the speaker 200. However, other microphone-to-mounting surface angles are also possible, as will be recognized by one skilled in the art.

Likewise, the table 250 may be of any shape, height, and material commonly used in the art, as long as the table 250 includes a flat surface for attachment of the elevated toroid microphone. Further, though speaker 200 is shown on the right side of room 270, speaker 200 may be located at any compass position between 0° to 360° with respect to either microphones A or B. Multiple speakers may also be accommodated by elevated toroid microphones A and B without departing from the scope of the invention.

Figure 3:
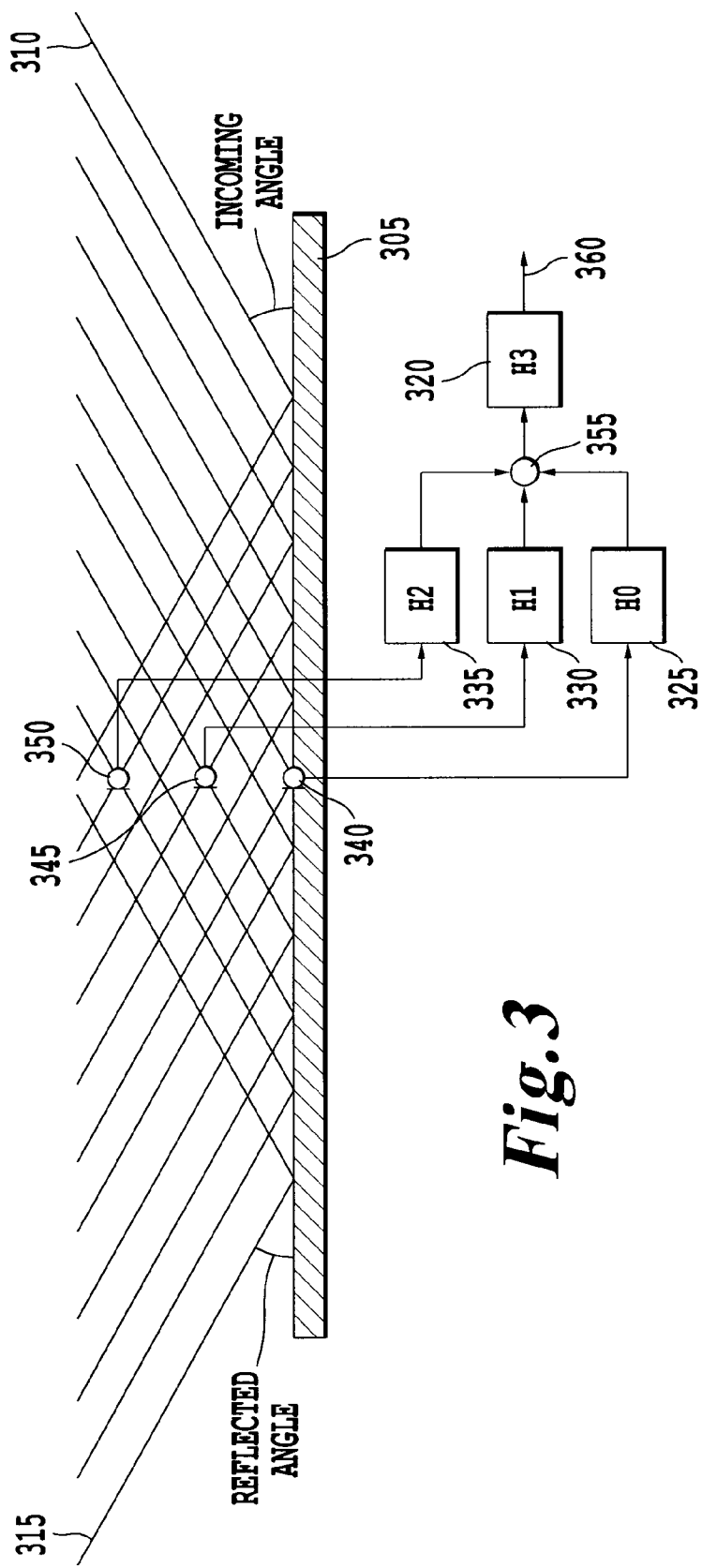
FIG. 3 is a schematic drawing of a elevated toroid microphone according to an exemplary embodiment of the present disclosure.

FIG. 3 is an elevated toroid microphone 300 according to an exemplary embodiment of the present disclosure. Elevated toroid microphone 300 includes three omni directional microphone elements 340, 345 350, and three electronic filters 325, 330, 335 corresponding to frequency responses $H_0$, $H_1$ and $H_2$ respectively. The output of the three filters 325, 330 and 335 are added in the summing node 355 and equalized in equalizer 320, which has the frequency response $H_3$. The overall output of the elevated toroid microphone 360 corresponds to the output of the equalizer 320.

The microphone elements 340, 345 and 350 are arranged on the table 305 to capture both direct sound waves and sound waves reflected by the table-top 305. Microphone element 340 is placed directly on the table 305 to exploit the boundary principle. Microphone element 345 coincides with microphone element 340 with respect to a vertical axis, but is a distance (d) above the table 305. Likewise, microphone element 350 coincides to the same vertical axis as microphone elements 340 and 345, but is two times the distance (d) above the table 305. In the above description, distance (d) should be less than half of a wavelength of a highest-frequency component to be captured by the elevated toroid microphone 300.

In FIG. 3, direct sound waves 310 arrive at the table 305 at incoming angle (β), are reflected by the table 305 to form reflected sound waves 315. Microphone element 340 captures both the direct sound waves and reflected sound waves from the table, making use of the pressure-doubling principle to increase sensitivity. Microphone elements 345 and 350 receive both direct sound waves 310 and reflected sound waves 315 that are delayed with respect to the direct sound waves 310. The amount of delay of the reflected sound waves 315 depends on the incoming angle (β) and the distance (d). Any sound waves originating below the table are blocked by the table surface 305.

The sound waves captured by microphone elements 340, 345 and 350 are converted to electrical impulses and provided to filters 325, 330 and 335 for processing. Filters 325, 330 and 335 define the elevated toroid directivity function, and respectively have frequency responses of:

$$H_0(\omega) = \cos(\kappa) - \cos(2\%)$$

$$H_1(\omega) = \cos(2\%) - 1$$

$$H_2(\omega) = 1 - \cos(\kappa).$$

In the above equations, $\kappa = \omega \times (d/c)$, where $\omega$ is the frequency in radians per second, and c is the speed of sound in air.

The resulting electronic signals generated by filters 325, 330 and 335 are summed at a summing node 355 and then equalized by equalizer 320, which has a frequency response ($H_3$) given by: $H_3(\omega) = (2[\cos(\kappa)(1 - \cos(2\kappa rl;\sqrt{1/2}rlx) + \cos(2\kappa)(\cos(\kappa rl;\sqrt{1/2}rlx)) - 1) - \cos(\kappa rl;\sqrt{1/2}rlx) + \cos(2\kappa rl;\sqrt{1/2}rlx)])^{-1}$, where $\omega$ and $\kappa$ are defined above.

The above exemplary frequency response ($H_3$) has a flat response for an elevation angle of 45°. However, other equalizer frequency responses for elevation angles between 42° and 49° may also be used without departing from the scope of this disclosure.

Filters 325, 330 and 335, equalizer 320 and summing node 335 may be implemented as digital structures, in which case A/D converters (not shown) convert the electrical impulses from microphone elements 340, 345 350 into digital audio data. Filters 325, 330 and 335 may then be implemented as infinite impulse response (IIR) filters or finite impulse response (FIR) filters. Further, the equalizer may also be implemented as IIR or FIR filters.

Figure 4:
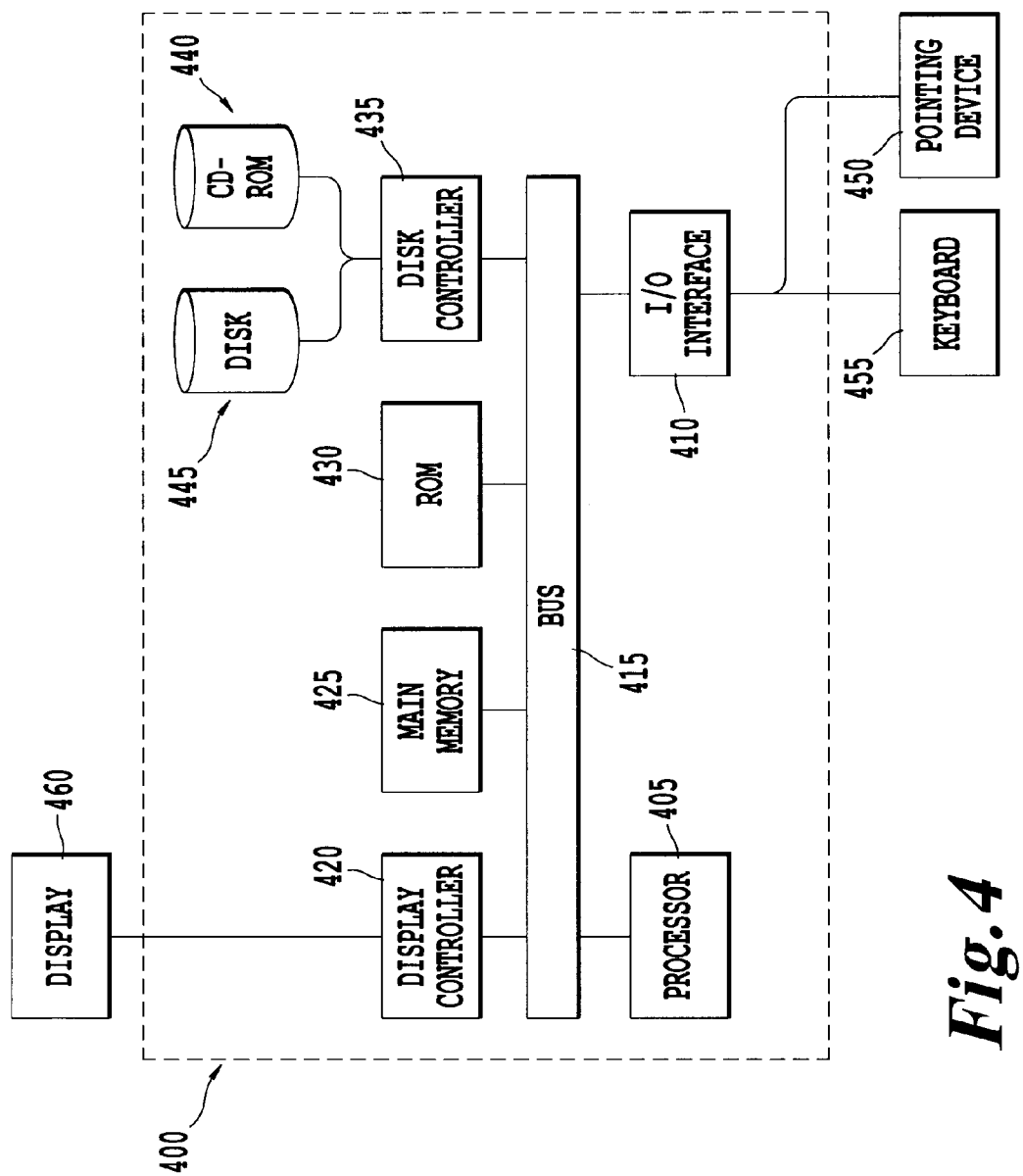
FIG. 4 is a schematic drawing of a processor used to implement the functions corresponding to frequency responses $H_0$, $H_1$, $H_2$ and $H_3$ according to an exemplary embodiment of the present disclosure.

Filters 325, 330 and 335, summing node 355 and equalizer 320 may also be implemented separately or integrated in a single device. For example, filters 325, 330 and 335, summing node 355 and equalizer 320 may be implemented on a PC computer 400, such as the one in FIG. 4. The computer 400 includes a processor 405 for performing computations, a read-only memory (ROM) 430 for storing programming instructions, and a main memory 425 that may include RAM memory, FLASH memory, EEPROM memory or any other rewritable memory. The main memory 425 stores temporary data, instructions, etc. The computer 400 also includes a display controller 420 for controlling a display device 460, a disk controller 435 for controlling a hard disk 445 and/or a CD-ROM drive 440, and an I/O interface 410 for controlling a pointing device 450 and a keyboard 455. A bus 415 interconnects all of the above-described components.

Hard disk drive 445 and CD-ROM drive 440 may be integrated into the computer 400, or may be removable. Likewise, at least a portion of the main memory 425 may also be removable. Though not shown in FIG. 4, the I/O interface 410 may also interface to a network, phone system, WiFi network, cellular network, WAN, LAN, etc.

The frequency responses ($H_0$, $H_1$, $H_2$, and $H_3$) and the summing node 335 may also be implemented on computer 400 as a utility application, background demon, or component of an operating system, or any combination thereof executing in conjunction with the processor 405 and an operating system, such as Microsoft VISTA, UNIX, SOLARIS, LINUX, Apple MAC-OS and other known systems.

Further, filters 325, 330 and 335, summing node 355 and equalizer 320 may be implemented in hardware, together or separately, on devices such as FPGA's, ASIC's, microcontrollers, PLD's, or other computer readable media such as an optical disc.

Together, filters 325, 330, 335, summing node 355 and equalizer 320 combine the electronic impulses from microphone elements 340, 345 and 350 to generate an overall frequency response for the elevated toroid microphone given by:

$$H(\omega, \beta) = H_3 \begin{bmatrix} 2H_0(\omega) + 2H_1 \cos\left(\omega d * \frac{\sin(\beta)}{c}\right) + \\ 2H_2 \cos\left(2\omega d * \frac{\sin(\beta)}{c}\right) \end{bmatrix},$$

where $\omega$, $\beta$ and c are defined above.

FIGS. 5A-5F includes a series of polar responses for a table-top elevated toroid microphone with dimension (d) equal to 0.02 meters. The polar responses are only defined for angles between 0° and 180° because a table, on which the elevated toroid microphone is placed, blocks any sound waves from angles 180° to 360°. Each of FIGS. 5A-5F corresponds to the elevated toroid microphone response at a different frequency. Frequencies of 100 hertz, 240 hertz, 577 hertz, 1,386 hertz, 3,330 hertz and 8,000 hertz are represented, by way of example. However, an elevated toroid microphone response may be generated for any frequency.

Figure 6A:
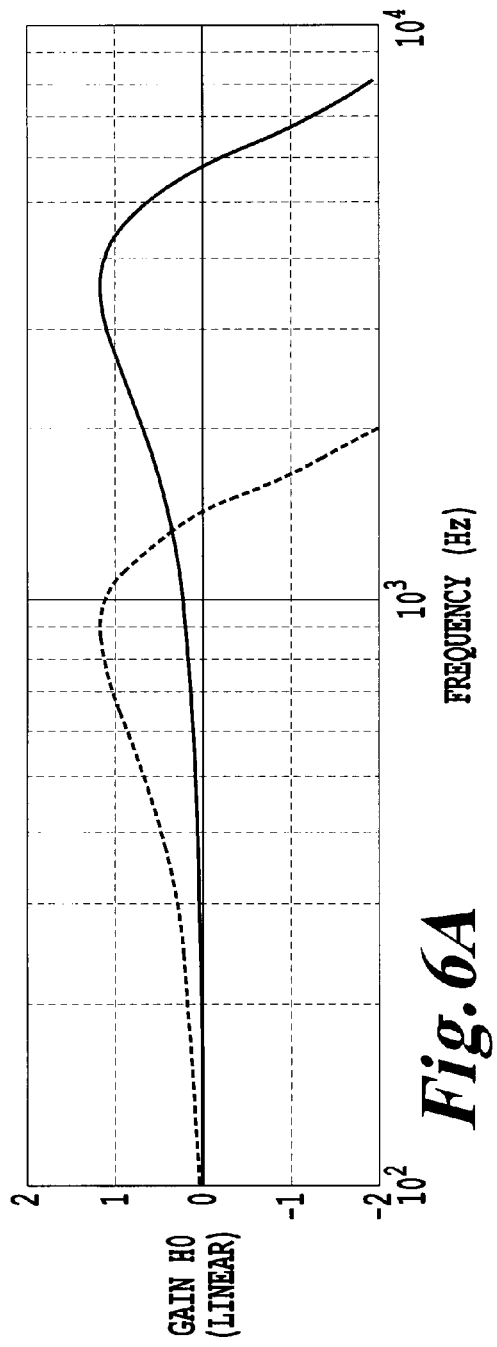
FIGS. 6A-6B are magnitude plots of the response ($H_0$) according to an exemplary embodiment of the present disclosure.
Figure 6B:
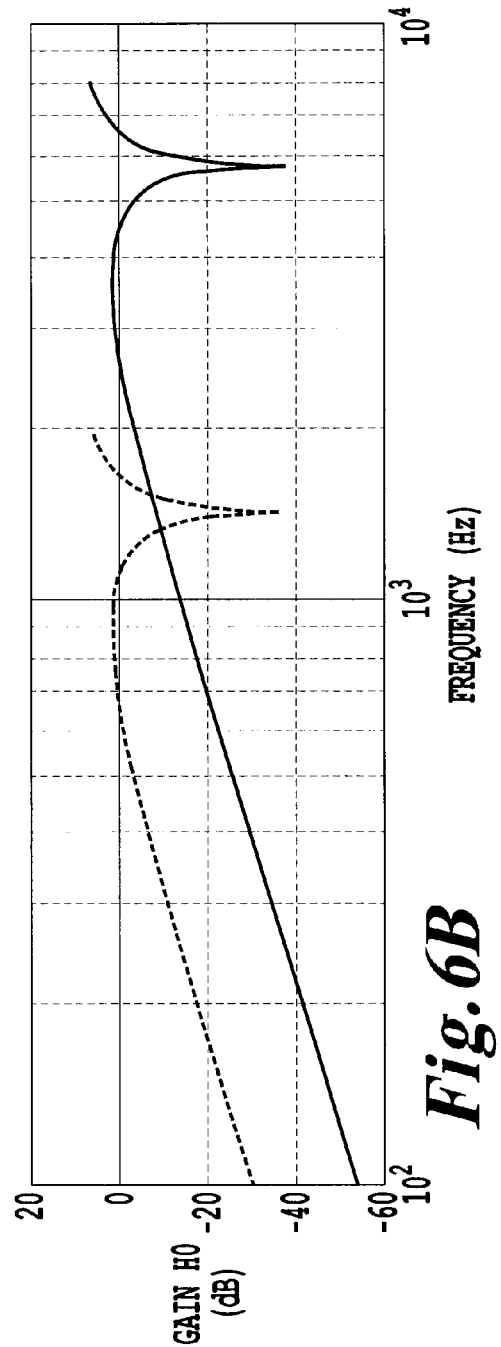

FIGS. 6A-6B are magnitude response plots for the frequency response ($H_0$) corresponding to filter 325. FIG. 6A is a linear response, and FIG. 6B is a response in decibels. In FIGS. 6A-6B, the solid line corresponds to a distance (d) of 0.02 meters while the dotted line corresponds to a distance (d) of 0.1 meters. Filter 325 may be implemented as a linear phase (FIR) filter, but other implementations such as an IIR filter or an analog filter are also possible.

FIGS. 7A-7B are magnitude plots of the frequency response ($H_1$) corresponding to filter 330. FIG. 7A is a linear scale plot and FIG. 7B is a decibel scale plot. The solid lines in FIGS. 7A-7B correspond to a distance (d) of 0.02 meters, and the dotted lines correspond to a distance (d) of 0.1 meters. Filter 330 may likewise be implemented as a linear phase FIR filter, IIR filter or analog filter.

FIGS. 8A-8B are magnitude plots of frequency response ($H_2$) corresponding to filter 340 for a distance (d) of 0.02 meters (solid line) and a distance (d) of 0.1 meters (dotted line). FIG. 8A is in a linear scale, and FIG. 8B is in decibels. Filter 340 may be implemented as a linear phase FIR filter, IIR filter or analog filter.

Figure 9A:
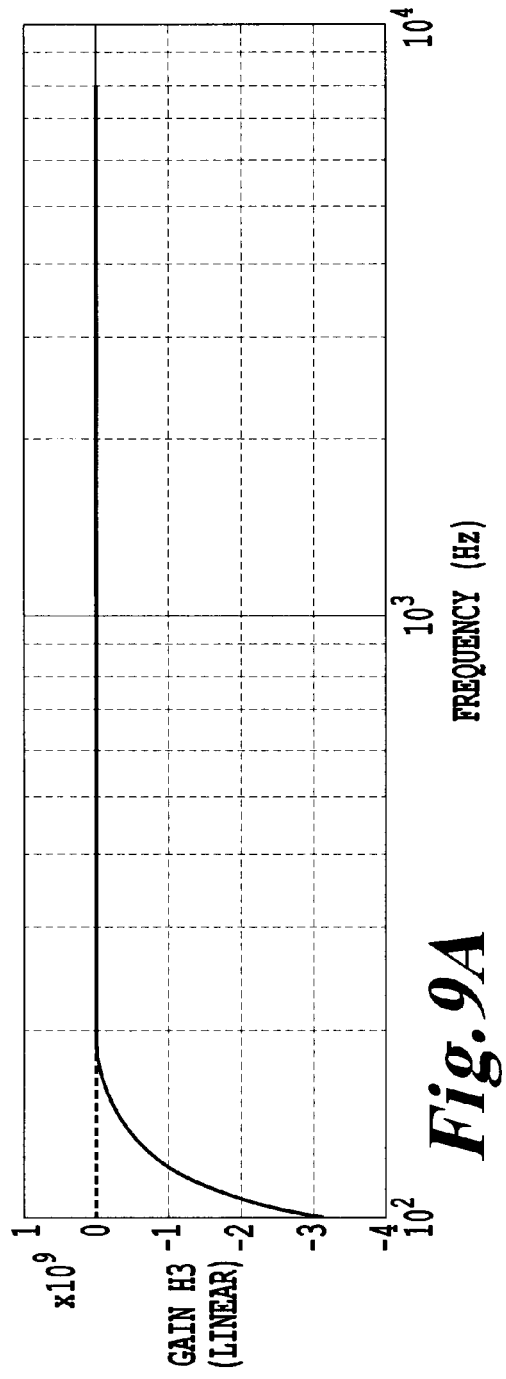
FIGS. 9A-9B are magnitude plots of the frequency response ($H_3$) according to an exemplary embodiment of the present disclosure.
Figure 9B:
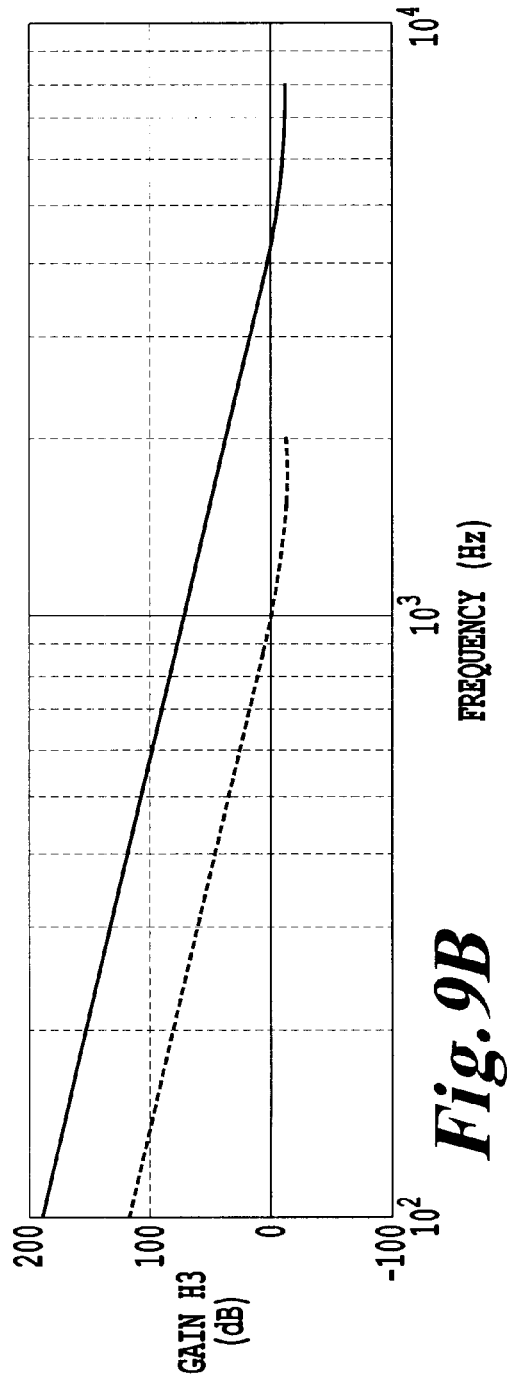

A magnitude plot corresponding to the frequency response ($H_3$) of the equalizer 320 is included in FIG. 9A as a linear scale graph, and in FIG. 9B as a logarithmic (decibel) scale graph. The equalizer 320 may be implemented as a IIR filter, adaptive filter, analog filter, etc. Further, in FIGS. 9A-9B, the solid lines correspond to a distance (d) of 0.02 meters and the dotted lines correspond to a distance (d) of 0.1 meters.

The gain of equalizer 320 at low frequencies may amplify internal noise generated by the microphone elements 340, 345 and 350, which is undesirable. In addition, the low frequency gain of the equalizer 320 may also amplify A/D converter noise, quantization noise or noise due to numerical rounding.

One way to mitigate noise from the above-noted sources is to configure filters 325, 330 and 335 as band pass filters having a high-pass roll off frequency of 80 hertz. Attenuation of frequencies below 80 hertz minimally impacts sound quality, but reduces the effect of microphone, A/D converter, quantization and/or numerical rounding noise.

Alternatively, some of the low frequency gain of the equalizer 320 may be transferred to filters 325, 330 and 335, which have a 12 decibel per octave magnitude slopes. This may reduce numerical/quantization noise problems originating at or after filters 325, 330 and 335. Additionally, some degradation of the directivity pattern at low frequencies may be accepted in exchange for filter responses that eliminate noise at low frequencies. Likewise, some degradation in the high frequency sensitivity pattern may be acceptable in order to reduce system noise.

Figure 10:
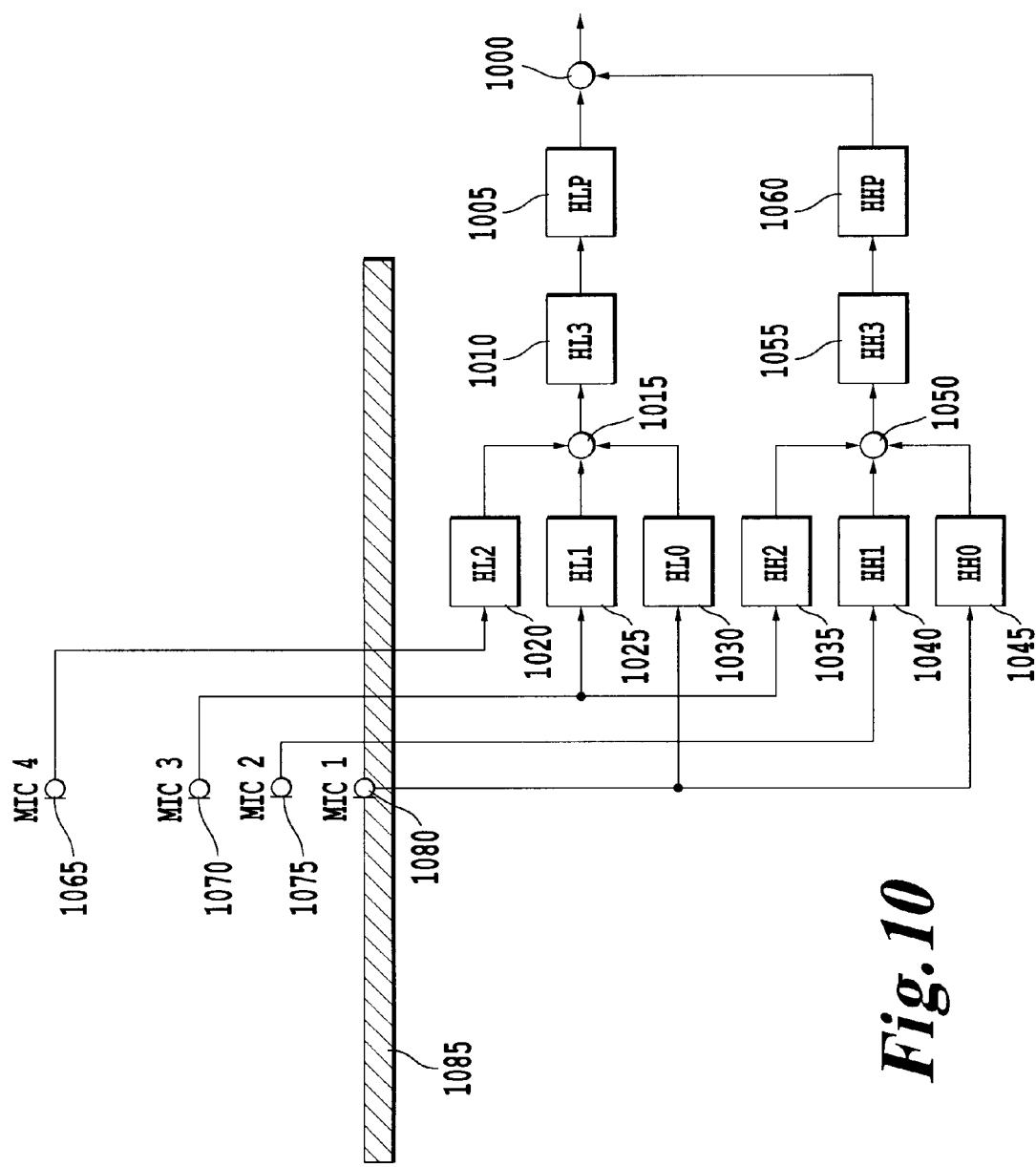
FIG. 10 is a schematic diagram of an elevated toroid microphone according to another exemplary embodiment of the present disclosure.

FIG. 10 is another exemplary embodiment of an elevated toroid microphone according to the present disclosure. In FIG. 10 four omni directional microphone elements 1065, 1070, 1075 and 1080 are used to reduce the impact of system noise. Microphone element 1080 is placed directly on the table surface 1085, and microphone element 1065, 1070 and 1075 are aligned to microphone 1080 with respect to a vertical axis. Microphone 1075 is a distance (d) above microphone 1080, microphone 1070 is twice the distance (d) above microphone 1080, and microphone 1065 is four times the distance (d) above microphone 1080. Further, microphone 1080 is connected to filters 1030 and 1045, microphone 1075 is connected to filter 1040, microphone 1070 is connected to filters 1025 and 1035, and microphone 1065 is connected to filter 1020.

Filters 1020, 1025 and 1030 are the low-frequency filters whose outputs are summed at a low frequency summing node 1015. The output of the low frequency summing node 1015 is equalized by low frequency equalizer 1010 and then filtered by low pass filter 1005. Likewise, filters 1035, 1040 and 1045 are the high frequency filters whose outputs are summed at the high frequency summing node 1050. The output of the high frequency summing node 1050 is equalized by high frequency equalizer 1055 and then high pass-filtered by high pass filter 1060. The outputs of low pass filter 1005 and high pass filter 1060 are summed at the summing node 1000 to obtain the output of the elevated toroid microphone.

Operationally, microphone elements 1070, 1075 and 1080 capture high frequency sound waves, and convert them to electrical impulses for filtering by filters 1035, 1040 and 1045. The filter outputs are added together by high frequency summing node 1050, and equalized by high-frequency equalizer 1055. Then the high pass filter 1060 removes any low frequency components remaining in the output of equalizer 1055.

Likewise, microphone elements 1065, 1070 and 1080 capture low frequency sound waves, and convert them to electrical impulses for filtering by filters 1020, 1025 and 1030. The filter outputs are then added together by low frequency summing node 1015, and equalized by equalizer 1010. Low pass filter 1005 removes any remaining high frequency components. Then the outputs of low pass filter 1005 and high pass filter 1060 are added together by summing node 1000 to generate the overall elevated toroid microphone output.

Thus, the elevated toroid microphone of FIG. 10 uses microphone elements 1070, 1075 and 1080, which are closely spaced together, to capture high-frequency sound waves, and microphone elements 1065, 1070 and 1080, which are spaced further apart, to capture low-frequency sound waves. This two-way system implements a high frequency elevated toroid sensitivity pattern and a low frequency elevated toroid sensitivity pattern to remove system noise without distorting microphone sensitivity. As will be recognized by those skilled in the art, the two-way system of FIG. 10 may be extended to a three-way system, four-way system, or even an n-way system, where n is any positive integer. Further, any of the above-described system noise reduction techniques may be combined to further optimize performance of the elevated toroid microphone.

Though the above discussion has been made with reference to conventional omni directional microphone elements, other types of omni directional microphone elements may also be used without departing from the spirit of this disclosure. For example, optical microphones and/or MEMs microphones may be used. Optical microphones have very low internal noise, and MEMs microphones allow better component matching if all components, including the microphone, are fabricated on the same silicon wafer or the same silicon die. Of course, the filter responses ($H_0$, $H_1$, $H_2$) and the equalizer response ($H_3$) may have to be modified accordingly.

As recognized by the present inventor, the elevated toroid microphone as described herein is independent of azimuth angle, which makes it more suitable for video teleconference settings where multiple speakers and/or movable sound sources require good sensitivity in multiple directions. Further, the elevated toroid microphone has nearly zero sensitivity for audio sources on the table-top and for audio sources directly above the microphone. Therefore, noise interference is significantly reduced, and because the elevated toroid microphone is a directional microphone, it inherently limits reverberant sound.

Obviously, numerous modifications and variations of the present invention are possible in light of the above teachings. It is therefore to be understood that within the scope of the appended claims, the invention may be practiced otherwise than as specifically described herein.

The invention claimed is:

1. An elevated toroid microphone comprising:
a first microphone element assembly including a first microphone element arranged adjacent to a supporting surface and a first filter connected to the first microphone element, the first filter having a frequency response $H_0$;
a second microphone element assembly including a second microphone element arranged a predetermined distance d from the supporting surface and a second filter connected to the second microphone element, the second filter having a frequency response $H_1$;
a third microphone element assembly including a third microphone element arranged at twice the predetermined distance d from the supporting surface and a third filter connected to the third microphone element, the third filter having a frequency response $H_2$;
an adder configured to combine outputs of the first, second and third microphone assemblies into an adder output; and
an equalizer configured to generate an equalized output in response to the adder output,
wherein a combination of $H_0$, $H_1$, and $H_2$ generates an elevated toroid directivity pattern for the elevated toroid microphone.

2. The elevated toroid microphone according to claim 1, wherein the elevated toroid directivity pattern has a minimum sensitivity at elevation angles β corresponding to 0 degrees, 90 degrees and 180 degrees with respect to the supporting surface.

3. The elevated toroid microphone according to claim 2, wherein the predetermined distance d is no more than half of a wavelength corresponding to a highest frequency captured by the elevated toroid microphone.

4. The elevated toroid microphone according to claim 3, wherein an equalizer frequency response $H_3$ corresponds to a flat overall elevated toroid microphone frequency response at an elevation angle β of 45 degrees with respect to the supporting surface.

5. The elevated toroid microphone according to claim 4, wherein the equalizer frequency response $H_3$ includes a low-frequency roll-off at 80 Hz.

6. The elevated toroid microphone according to claim 3, wherein ω is angular frequency, c is a speed of sound through air and $$H_0 = \cos(k) - \cos\left(2 \cdot \frac{\omega \cdot d}{c}\right)$$
$$H_1 = \cos\left(2 \cdot \frac{\omega \cdot d}{c}\right) - 1$$
$$H_2 = 1 - \cos\left(\frac{\omega \cdot d}{c}\right).$$

7. The elevated toroid microphone according to claim 1, wherein each of the first filter, second filter, third filter and equalizer is a digital filter.

8. The elevated toroid microphone according to claim 1, wherein the first, second and third microphone elements are omni directional microphone elements.

9. An elevated toroid microphone comprising:
a first microphone element arranged adjacent to a supporting surface and connected to a first low frequency filter having a frequency response $H_{L0}$ and a first high frequency filter having a frequency response $H_{H0}$;
a second microphone element arranged a predetermined distance d from the supporting surface and connected to a second high frequency filter having a frequency response $H_{H1}$;
a third microphone element arranged at twice the predetermined distance d from the supporting surface and connected to a second low frequency filter having a frequency response $H_{L1}$ and a third high frequency filter having a frequency response $H_{H2}$;
a fourth microphone element arranged at four times the predetermined distance d from the supporting surface and connected to a third low frequency filter having a frequency response $H_{L2}$;
a high frequency adder configured to combine outputs from the first, second and third high frequency filters;

a low frequency adder configured to combine outputs from the first, second and third low frequency filters;

a high frequency equalizer configured to equalize an output of the high frequency adder;

a low frequency equalizer configured to equalize an output of the low frequency adder;

a high pass filter configured to filter an output of the high frequency equalizer;

a low pass filter configured to filter an output of the low frequency equalizer; and an adder configured to combine an output of the high pass filter and an output of the low pass filter, wherein a combination of $H_{L0}$, $H_{L1}$, $H_{L2}$ generates a low frequency elevated toroid directivity pattern and a combination of $H_{H0}$, $H_{H1}$ and $H_{H2}$ generates a high frequency elevated toroid directivity pattern for the elevated toroid microphone.

10. The elevated toroid microphone according to claim 9, wherein the elevated toroid directivity pattern has a minimum sensitivity at elevation angles β corresponding to 0 degrees, 90 degrees and 180 degrees with respect to the supporting surface.

11. The elevated toroid microphone according to claim 10, wherein the predetermined distance d is no more than half of a wavelength corresponding to a highest frequency captured by the elevated toroid microphone.

12. The elevated toroid microphone according to claim 11, wherein a frequency response of the high frequency equalizer and a frequency response of the low frequency equalizer combine to generate a flat overall microphone frequency response of the microphone at an elevation angle β of 45 degrees with respect to the supporting surface.

13. The elevated toroid microphone according to claim 12, wherein ω is angular frequency, c is a speed of sound through air and $$H_{H0} = \cos\left(\frac{\omega \cdot d}{c}\right) - \cos\left(2 \cdot \frac{\omega \cdot d}{c}\right),$$

$$H_{H1} = \cos\left(2 \cdot \frac{\omega \cdot d}{c}\right) - 1,$$

$$H_{H2} = 1 - \cos\left(\frac{\omega \cdot d}{c}\right),$$

$$H_{L0} = \cos\left(2 \cdot \frac{\omega \cdot d}{c}\right) - \cos\left(4 \cdot \frac{\omega \cdot d}{c}\right),$$

$$H_{L1} = \cos\left(4 \cdot \frac{\omega \cdot d}{c}\right) - 1,$$

$$H_{L2} = 1 - \cos\left(\frac{\omega \cdot d}{c}\right).$$

14. The elevated toroid microphone according to claim 11, wherein a frequency response of the high frequency equalizer and a frequency response of the low frequency equalizer combine to generate a low-frequency roll-off at 80 Hz in an overall microphone frequency response.

15. The elevated toroid microphone according to claim 9, wherein each of the first high frequency filter, second high frequency filter, third high frequency filter, first low frequency filter, second low frequency filter, third low frequency filter, low frequency equalizer, high frequency equalizer, low pass filter and high pass filter is a digital filter.

16. An elevated toroid microphone, comprising:

means for converting audio waves at a supporting surface into a corresponding first audio data;

means for converting audio waves at a predetermined distance d from the supporting surface into a corresponding second audio data;

means for converting audio waves at twice the predetermined distance d from the supporting surface into a corresponding third audio data;

means for filtering the first audio data according to a first frequency response $H_0$;

means for filtering the second audio data according to a second frequency response $H_1$;

means for filtering the third audio data according to a third frequency response $H_2$;

means for combining the filtered first, second and third audio data; and means for equalizing the a combined audio data, wherein $H_0$, $H_1$ and $H_2$ combine to generate an elevated toroid directivity pattern for the elevated toroid microphone.

17. The elevated toroid microphone according to claim 16, wherein the elevated toroid directivity pattern has a minimum sensitivity at elevation angles β corresponding to 0 degrees, 90 degrees and 180 degrees with respect to the supporting surface.

18. The elevated toroid microphone according to claim 17, wherein the predetermined distance d is no more than half of a wavelength corresponding to a highest frequency captured by the microphone.

19. The elevated toroid microphone according to claim 18, wherein an overall frequency response of the microphone is flat at an elevation angle a β of 45 degrees with respect to the supporting surface.

20. The elevated toroid microphone according to claim 18, wherein ω is angular frequency, c is a speed of sound through air and $$k = \frac{\omega \cdot d}{c},$$

$$H_0 = \cos\left(\frac{\omega \cdot d}{c}\right) - \cos\left(2 \cdot \frac{\omega \cdot d}{c}\right),$$

$$H_1 = \cos\left(2 \cdot \frac{\omega \cdot d}{c}\right) - 1,$$

$$H_2 = 1 - \cos\left(\frac{\omega \cdot d}{c}\right).$$

* * * * *